US012784253B2

(12) United States Patent
Schönberger et al.

(10) Patent No.: US 12,784,253 B2
(45) Date of Patent: Nov. 3, 2026

(54) REGISTERING COORDINATE FRAMES OF A HEAD MOUNTED DISPLAY FOR MIXED REALITY

(71) Applicant: Microsoft Technology Licensing, LLC, Redmond, WA (US)

(72) Inventors: Johannes Lutz Schönberger, Zurich (CH); Marc André Léon Pollefeys, Zurich (CH)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/439,764

(22) Filed: Feb. 12, 2024

(65) Prior Publication Data

US 2025/0259326 A1 Aug. 14, 2025

(51) Int. Cl.

*G06T 7/70* (2017.01)
*G02B 27/00* (2006.01)
*G02B 27/01* (2006.01)
*G06F 3/01* (2006.01)
*G06T 19/00* (2011.01)

(52) U.S. Cl.

CPC ............ *G06T 7/70* (2017.01); *G02B 27/0093* (2013.01); *G02B 27/0172* (2013.01); *G06F 3/013* (2013.01); *G06F 3/017* (2013.01); *G06T 19/006* (2013.01); *G02B 2027/0174* (2013.01)

(58) Field of Classification Search

None
See application file for complete search history.

(56) References Cited

U.S. PATENT DOCUMENTS 7,369,101 B2 * 5/2008 Sauer ...................... G06F 3/012 345/629
9,384,594 B2 7/2016 Maciocci
10,776,954 B2 9/2020 Bleyer
11,640,055 B2 * 5/2023 Gullicksen ............. G01R 33/02 342/367
11,751,944 B2 * 9/2023 Lang ...................... A61B 34/10 606/130
12,469,402 B2 * 11/2025 Sawhney ................ G06F 3/011
(Continued)

OTHER PUBLICATIONS

Garcia-Pereira, et al., "Cross-Device Augmented Reality Annotations Method for Asynchronous Collaboration in Unprepared Environments" Information, vol. 12, Dec. 14, 2021, 19 pages.
(Continued)

*Primary Examiner* — Tahmina N Ansari
(74) *Attorney, Agent, or Firm* — Workman Nydegger

(57) ABSTRACT

A method of registering a coordinate frame of an HMD with a second coordinate frame comprises receiving sensor data depicting the wearer of the HMD pointing at, gazing at, or touching, a real world feature, where the 3D position of the real world feature in the second coordinate frame is known. The method computes a 3D position of the real world feature, in the coordinate frame of the HMD, from the sensor data. A correspondence is stored comprising: the 3D position of the real world feature in the coordinate frame of the HMD, and a 3D position of the real world feature in the second coordinate frame. The method repeats so that a second correspondence is stored. The method registers the coordinate frame of the HMD and the second coordinate frame by computing registration from the correspondences.

20 Claims, 9 Drawing Sheets

(56) References Cited

U.S. PATENT DOCUMENTS

| | | | | |
|---|---|---|---|---|
| 2002/0105484 | A1 * | 8/2002 | Navab | H04N 13/327<br>348/E13.052 |
| 2016/0012643 | A1 * | 1/2016 | Kezele | H04N 13/344<br>345/633 |
| 2017/0213473 | A1 | 7/2017 | Ribeira | |
| 2019/0114802 | A1 * | 4/2019 | Lazarow | H04W 56/001 |
| 2020/0391115 | A1 | 12/2020 | Leeper | |
| 2021/0263468 | A1 * | 8/2021 | Gilles | G03H 1/0808 |
| 2021/0364790 | A1 * | 11/2021 | Gullicksen | G01R 33/02 |
| 2022/0130116 | A1 | 4/2022 | Mccall | |
| 2022/0287676 | A1 * | 9/2022 | Steines | A61B 34/10 |
| 2023/0019745 | A1 * | 1/2023 | Sawhney | G06F 3/011 |
| 2024/0146835 | A1 * | 5/2024 | Cohen | H04M 1/724097 |
| 2025/0259326 | A1 * | 8/2025 | Schönberger | G06T 7/70 |

OTHER PUBLICATIONS

Khan, et al., "A Method for Measuring the Perceived Location of Virtual Content in Optical See Through Augmented Reality", IEEE Conference on Virtual Reality and 3D User Interfaces Abstracts and Workshops, May 6, 2021, 2 pages.

Extended European search report received in European Application No. 25154226.2, mailed on Jun. 5, 2025, 13 pages.

Sun, et al., "Fast and accurate online calibration of optical see-through head-mounted display for AR-based surgical navigation using Microsoft HoloLens", International journal of computer assisted radiology and surgery, vol. No. 15, Issue No. 11, Aug. 18, 2020, 1907-1919.

* cited by examiner

REGISTERING COORDINATE FRAMES OF A HEAD MOUNTED DISPLAY FOR MIXED REALITY

BACKGROUND

Mixed-reality display devices enable users to view both the real world as well as virtual objects such as holograms. This is typically achieved using a head mounted display HMD where a wearer of the HMD is able to view their environment through a visor and is also able to perceive three dimensional digital objects, referred to as holograms, as if they are present in the environment. Stereoscopic images may be projected into the pupils of the wearer by display equipment in the HMD so that the user perceives the three-dimensional digital object placed in the environment.

In many mixed-reality applications such as telepresence, games, enabling remote human experts to guide an HMD wearer on a complex task, and others, there is a benefit to anchoring holograms and other digital content to locations in the real world. The term "anchoring" in this context means that as the HMD wearer moves computations are carried out to enable the hologram to be perceived by the HMD wearer as attached to a position in the real world to which it has been anchored. Anchoring is useful to avoid the wearer experiencing nausea, becoming disoriented and to enable the wearer to intuitively use a mixed-reality computing device.

The embodiments described below are not limited to implementations which solve any or all of the disadvantages of known mixed-reality technologies.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

Mixed reality examples use minimal human interaction with a scene in order to provide reliable, accurate, and (optionally) privacy preserving registration between coordinate frames of an HMD wearer and a second coordinate frame. The second coordinate frame may be a coordinate frame of a 3D model from which holograms may be rendered, a robot, a second HMD wearer or other entity. Once the registration is achieved, registration information is usable to facilitate mixed reality applications including but not limited to: persisting holograms, sharing holograms, anchoring holograms to a real world environment.

In various examples there is a method of registering a coordinate frame of an HMD with a second coordinate frame, the method comprising:

requesting a wearer of the HMD to point at, or gaze at, or touch, a real world feature. Sensor data is received depicting the wearer of the HMD pointing at, gazing at, or touching, the real world feature, where the 3D position of the real world feature in the second coordinate frame is known. The method computes a 3D position of the real world feature, in the coordinate frame of the HMD (and optionally also orientation information such as gravity direction, or compass measurements or a local surface normal), from the sensor data. A correspondence is stored comprising: the 3D position of the real world feature in the coordinate frame of the HMD, and a 3D position of the real world feature in the second coordinate frame. The method repeats the requesting, using, computing and storing for a second real world feature so that a second correspondence (and optionally more correspondences) is/are stored. The method registers the coordinate frame of the HMD and the second coordinate frame by computing registration information mapping between the coordinate frame of the HMD and the second coordinate frame, the registration information computed from the correspondences.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
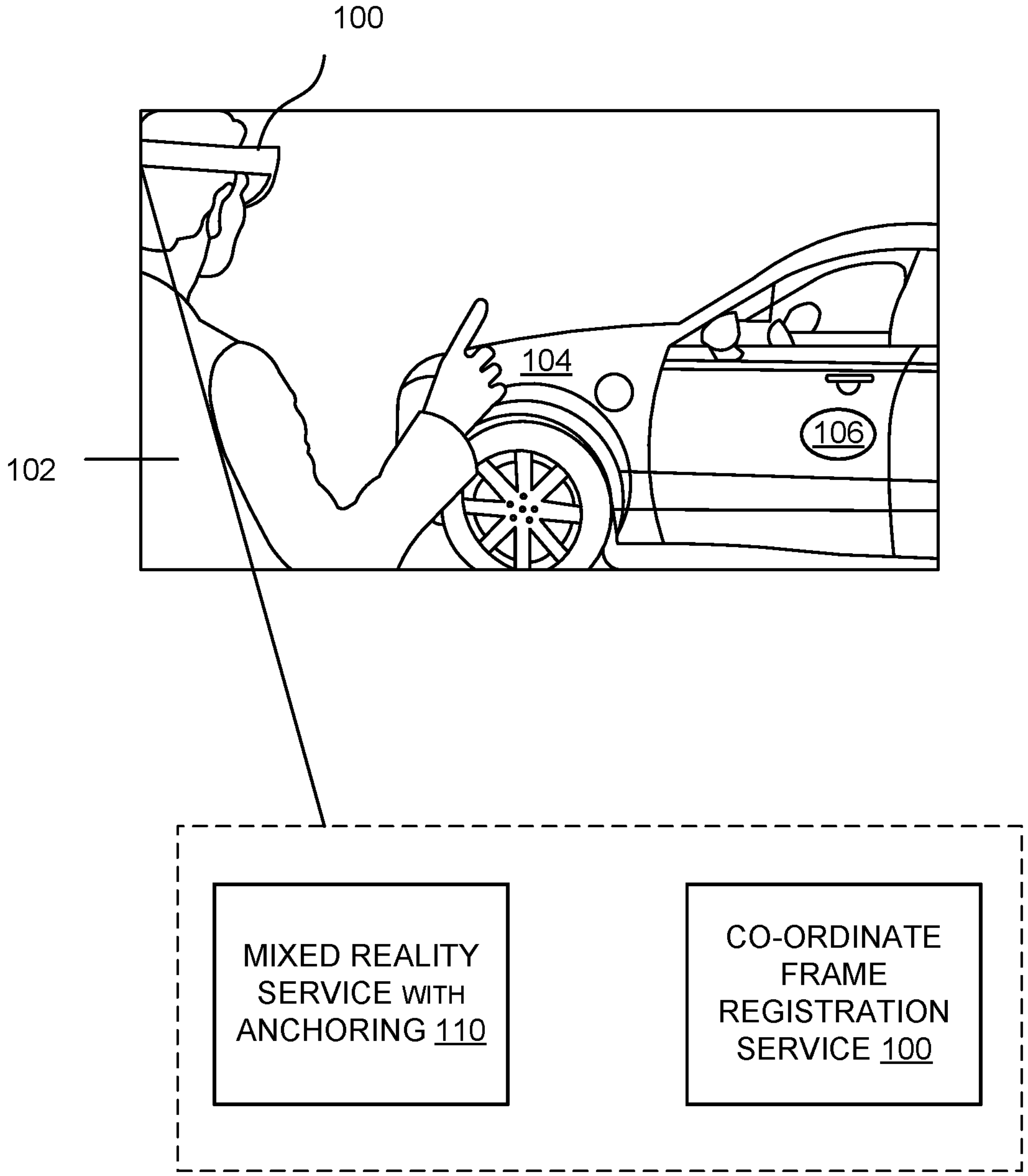
FIG. 1 shows an HMD wearer viewing a mixed-reality scene and where the HMD has access to a coordinate frame registration service and an mixed reality service with anchoring.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Many mixed-reality applications involve sharing holograms across devices or persisting them over time. In order to achieve the sharing or persisting, the holograms have to be anchored to the real world environment. Consider a situation where several people are in a meeting room and each person wears an HMD. One of the people operates a user interface to display a hologram of an object on a table in the office and shares the hologram with the other people so that the hologram appears to each person as being in the same position on the table in the office. In order to achieve this the hologram of the object has to be anchored to the position on the table. Each person has a different viewpoint of the table and the hologram and is able to perceive the object appropriately from their viewpoint because the hologram is 3D and is anchored. In contrast, where a hologram is not anchored to a real world location it moves with an HMD wearer and appears in the same position of the field of view of the HMD wearer as the HMD wearer moves.

To persist a hologram over time, the hologram is anchored to a real world location. In an example of persisting a hologram over time, a hologram is displayed sitting on a chair in a kitchen and is visible to an HMD wearer. When the HMD wearer leaves the room the hologram is no longer visible to the HMD wearer. Due to the anchoring, when the HMD wearer returns to the room two hours later, the HMD wearer is able to see the hologram at the same location, such as sitting on the chair in the kitchen.

The term "anchored" in this context means that as an HMD wearer moves, a 3D digital object (referred to as a hologram), visible to the HMD wearer, remains attached to a position in the real world to which it has been anchored.

In order to achieve anchoring, stereoscopic images presented to the HMD wearer by the HMD have to be rendered appropriately. The rendering process uses a 3D model from which the hologram was formed as well as registration information usable to map from a coordinate frame of the 3D digital object to a coordinate frame of the HMD. Given the registration information (comprising a 3D translation and a 3D rotation), stereoscopic images are rendered in order that the HMD wearer perceives the hologram anchored in the environment appropriately according to the viewpoint of the HMD. In an example, the stereoscopic images are rendered from a 3D model of the digital object and are then transformed using the registration information before being projected into pupils of an HMD wearer.

The term "coordinate frame" refers to a horizontal axis, vertical axis and depth axis, all originating from a 3D position referred to as an origin. In the case of a 3D model, a coordinate frame of the 3D model has an origin in or close to the 3D model and the 3D model is within a 3D space defined by horizontal, vertical and depth axes originating from the origin. The 3D position of the origin and the axes is selected using rules within software of a mixed-reality application. The 3D model is usable to create holograms by rendering from the 3D model using ray tracing or other rendering methods.

In the case of an HMD, a coordinate frame of the HMD has an origin in or close to the HMD and the HMD (and the wearer of the HMD) is within a 3D space defined by horizontal, vertical and depth axes originating from the origin. The 3D position of the HMD origin and the axes is selected using rules within software of a mixed-reality application.

In order to determine the registration information a calibration process is used. The calibration process comprises finding a plurality of correspondences, where a correspondence is a location in the HMD coordinate frame that corresponds to a location in a second coordinate frame. The second coordinate frame may be a coordinate frame of a 3D model, a coordinate frame of another HMD, a coordinate frame of an autonomous robot, or a coordinate frame of another entity. Once sufficient correspondences are available, geometry is used to compute the registration information. Finding correspondences is not straightforward however, as now explained.

In some approaches the calibration process comprises placing fiducial markers at known 3D positions in an environment and then using sensors on the HMD to capture images depicting the fiducial markers. The images depicting the fiducial markers are used to compute a 3D position of each fiducial marker in a coordinate frame of the HMD. In this way a plurality of correspondences are found, each correspondence being a 3D position in the HMD coordinate frame and a 3D position in the environment, which are known to depict the same fiducial marker. Given a plurality of such correspondences, geometry is used to compute the registration information. However, approaches using fiducial markers are problematic because fiducial markers have to be manually placed in the environment which is time consuming. Each fiducial marker is a physical reference point, such as a retroreflective cross hair, a sticker or physical label placed in the environment. Over time the fiducial markers may be damaged, lost or become occluded by other objects. In some examples the fiducial markers are two dimensional matrix barcodes such as quick response (QR) codes encoding digital information specifying their 3D position in the environment.

In another type of approach, keypoints are used, where a keypoint is a pre-specified 3D position in an environment; preferably where there is a change which can be detected by sensors such as a camera or depth sensor of the HMD. The pre-specified 3D positions in the environment have been defined by an operator during a manufacturing phase of a mixed-reality application and for a particular environment. In an example, the environment is a domestic kitchen and the keypoints are a top left corner of a window and a base of a ceiling light fitting. Sensors in the HMD capture images depicting the keypoints and are used to compute a 3D position of each keypoint in the HMD coordinate frame. A 3D position of each keypoint in a coordinate frame of the keypoints is known since the keypoints were defined during manufacture. Thus a plurality of correspondences are obtained, each correspondence being between a 3D position in keypoint coordinate frame and a 3D position in the HMD coordinate frame. The correspondences are used to compute the registration information via geometry.

In another type of approach, 2D keypoints are used rather than 3D keypoints. In the case that 2D keypoints are used, more correspondences are input to the process for computing the registration information than is the case where 3D keypoints are used. It is also possible to use a mixture of any of: fiducial marker, 2D keypoint, 3D keypoint.

Using keypoints is difficult in environments where there are few discernable permanent features. This makes keypoints surprisingly difficult to use in many scenarios such as where holograms are to be presented on meeting room display walls, hospital operating theatres, workshop benches and so on, since many of these surfaces do not have permanent features that are in a typical field of view of an HMD. It is especially difficult to reliably detect such discernable features on texture-less, shiny or reflective surfaces.

Using keypoints or fiducial markers brings security risks since information about the environment (i.e. the positions and nature of keypoints, the positions and nature of fiducial markers) has to be made available to an mixed reality application or other process computing the registration information. Once a malicious party gains the information about the environment from the keypoints or fiducial markers they are able to exploit that to potentially breach security of the environment.

FIG. 1 shows a head mounted display (HMD) wearer 102 viewing a mixed-reality scene and where the HMD 100 has access to a coordinate frame registration service 100 and a mixed reality service 110 with anchoring. The HMD is a mixed reality head mounted display device such as Microsoft Hololens (trade mark), Google Glasses (trade mark) or Sony SmartEyeglass (trade mark) or any other mixed reality head mounted display device or mixed reality wearable computer. The HMD sends sensor data to the coordinate frame registration service 100 together with a request to register a coordinate frame of the HMD with a second coordinate frame. The request may include an identifier of the second coordinate frame or the identifier of the second coordinate frame may be known to the coordinate frame registration service already. A non-exhaustive list of examples of the second coordinate frame is: coordinate frame of a second HMD, coordinate frame of a 3D model used to create holograms for display by the HMD, coordinate frame of an autonomous robot in the environment of the HMD, coordinate frame of another entity.

The coordinate frame registration service 100 registers the HMD coordinate frame with the second coordinate frame by computing registration information. The registration information comprises an orientation and a 3D translation (i.e. four degrees of freedom in total). The registration information is usable to map between the HMD coordinate frame and the second coordinate frame. The registration information is made available to a mixed reality service 110 such as to achieve anchoring of holograms perceived by the HMD wearer 102 to the real world environment, for hologram persistence, or for hologram sharing between HMD users or for other mixed reality purposes.

The coordinate frame registration service 100 is deployed in the HMD in some examples. In other examples the coordinate frame registration service 100 is deployed in the cloud or in a companion computing device of the HMD or in another computing entity in communication with the HMD. In some cases the functionality of the coordinate frame registration service 100 is shared between the HMD and another computing entity.

The mixed reality service 110 is deployed in the HMD in some examples. In other examples the mixed reality service 110 is deployed in the cloud or in a companion computing device of the HMD or in another computing entity in communication with the HMD. In some cases the functionality of the mixed reality service 100 is shared between the HMD and another computing entity.

The coordinate frame registration service 100 is computer implemented and it performs a method of registering a coordinate frame of an HMD (such as HMD 100) with a second coordinate frame. In the example of FIG. 1 the second coordinate frame is a coordinate frame of a real object in the environment, (in this example vehicle 104) although this is not limiting (other second coordinate frames may be used).

The coordinate frame registration service 100 receives sensor data depicting the wearer of the HMD pointing at, gazing at or touching a real world feature, where the 3D position of the real world feature in the second coordinate frame is known. In the example of FIG. 1 the real world feature is a logo 106 on a door of the vehicle and the HMD wearer is about to try to point at the logo 106 but is presently pointing their finger upwards. The 3D position of the logo 106 in the coordinate frame of the vehicle is already known by accessing it from a database, or determining it empirically. Determining empirically may comprise identifying a priori on the 3D model through a manual authoring step or an automatic selecting of features. Sensor data is captured depicting the wearer of the HMD pointing at, gazing at or touching the real world feature e.g. logo 106. In an example the sensor data is captured using sensors in the HMD such as cameras, depth sensors, inertial measurement units or other sensors. Some sensors may be pointing outwards from the HMD to observe the environment and some may be pointing inwards to observe the user to measure eye gaze, etc. In another example the sensor data is captured by sensors in the environment such as wall mounted cameras, depth sensors or other sensors. Receiving the sensor data enables the coordinate frame registration service 100 to compute a 3D position as now explained.

The coordinate frame registration service 100 computes a 3D position of the real world feature (such as logo 106), in the coordinate frame of the HMD, from the sensor data. This is achieved by detecting the pointing direction, the gaze direction or the touch location as described in more detail below. Since the 3D position is computed from the sensor data it can be achieved automatically in a principled manner. The coordinate frame registration service 100 stores a correspondence comprising: the 3D position of the real world feature in the coordinate frame of the HMD, and a 3D position of the real world feature in the second coordinate frame.

The coordinate frame registration service 100 repeats the requesting, using, computing and storing for a second real world feature so that a second correspondence is stored. If only two correspondences are used, gravity and scale information is used, such as IMU measurements in both coordinate frames. Otherwise, if gravity and scale are unknown, at least 3 correspondences are used to solve the registration problem. Thus minimal human interaction is needed in order to obtain the first and second correspondences. The coordinate frame registration service 100 registers the coordinate frame of the HMD and the second coordinate frame by computing registration information mapping between the coordinate frame of the HMD and the second coordinate frame, the registration information computed from the correspondences. Because the registration information is computed using sensor data and from minimal human interaction it is obtained in a principled way that gives accurate results without burdening a human user.

Once the registration information is computed it may be used by the mixed reality service such as for anchoring holograms to the real world scene perceived by the HMD wearer 100. The mixed reality service is able to compute holograms in the HMD coordinate system and map the holograms to the coordinate system of the vehicle so that the holograms appear anchored to the vehicle by the HMD wearer 102; that is a hologram on a bonnet of the vehicle remains anchored to the bonnet even when the HMD wearer 102 walks from a bonnet of the vehicle to the rear license plate of the vehicle.

Using sensor data depicting a human user pointing at, gazing at or touching at least two different real world features, enables the coordinate registration service to operate in an unconventional manner to achieve efficient, accurate registration of two coordinate systems for downstream use by a mixed reality service.

The coordinate registration service improves the functioning of an underlying computing device such as an HMD by enabling efficient, accurate registration of a coordinate system of the HMD with a second coordinate system.

Alternatively, or in addition, the functionality of the coordinate registration service described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Figure 2:
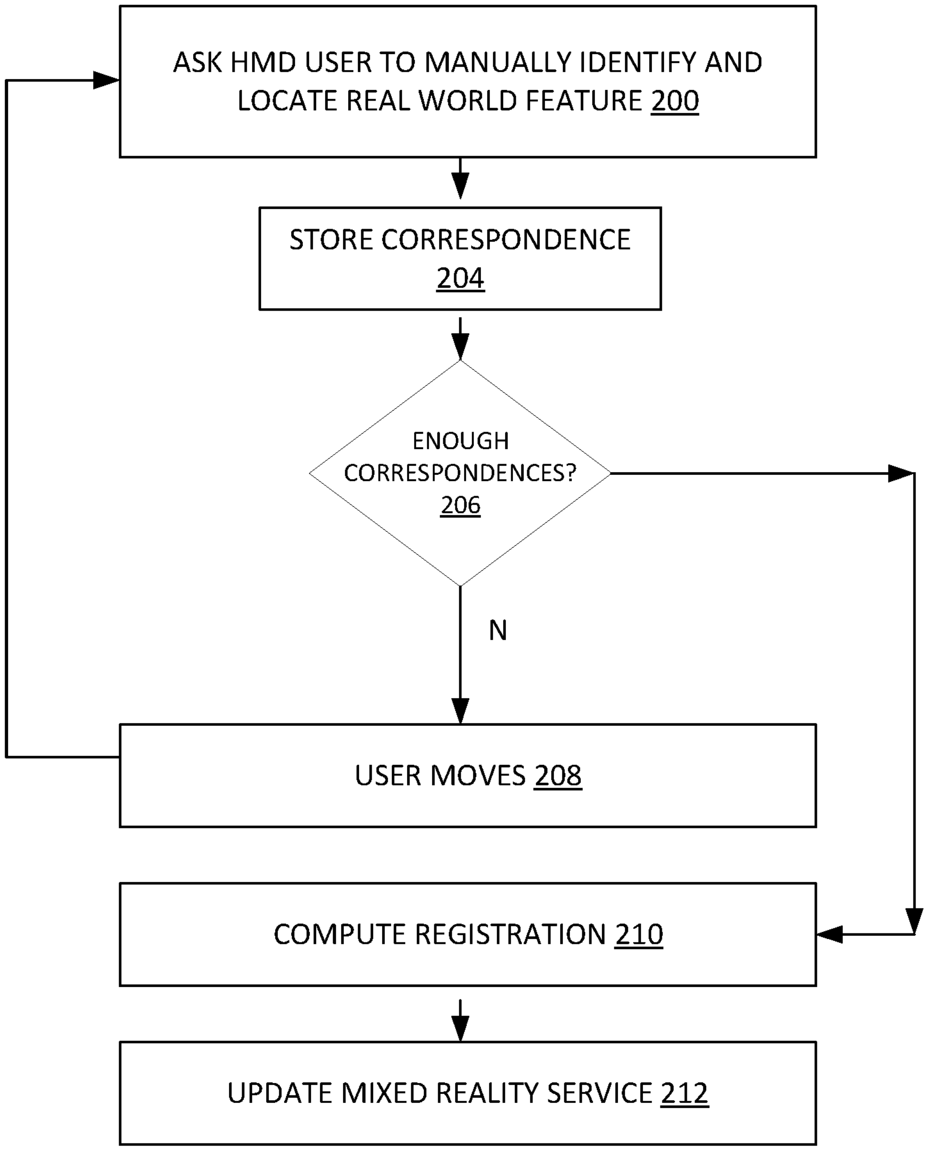
FIG. 2 is a flow diagram of a method performed by the coordinate frame registration service of FIG. 1.

FIG. 2 is a flow diagram of a method performed by the coordinate frame registration service of FIG. 1. An HMD user, wearing an HMD is asked 200 to manually identify and locate a real world feature. The coordinate registration service asks the HMD wearer to manually identify and locate discernable geometric features (points, lines, or other shapes) in the real world. In some examples the real world feature is close to or around a location where a hologram is to be displayed (such as in the example of FIG. 1) but this is not essential. The coordinate registration service asks the HMD wearer by any one or more of: using a loudspeaker to emit a speech signal describing the real world feature, by displaying a text description of the real world feature, by displaying a picture of the real world feature, by displaying a 3D scan of the real world feature or in other ways.

Sensor data depicting the HMD wearer is captured, such as by the HMD or by other sensors. The sensor data is analyzed to detect when the user is pointing at, gazing at or touching the real world feature and the sensor data from that time is examined to compute any of: a ray from an element of the user (such as a finger or a pointing tool the user is holding) towards the real world feature, a ray from a mid-point between the eyes of the user towards the real world feature, a 3D location of a point the user is touching.

To compute the ray from the element, tracking technology is used to track a 3D position of the finger or pointing tool and the position is extrapolated away from the HMD to obtain the ray. The tracking technology is any hand tracking or other tracking technology in the HMD or available as a service in another computing entity. In an example the tracking technology fits the captured sensor data to a 3D model of the HMD wearer's hand, or a 3D model of the HMD wearer's hand holding a pointing tool. During the fitting process the 3D position and orientation of the 3D model is adjusted to enable the captured sensor data to fit the 3D model. The adjusted 3D position and orientation of the 3D model then provide the 3D position of the finger or pointing tool.

To compute the ray from the mid-point between the eyes of the user, eye tracking functionality in the HMD or in the environment is used to detect a position of the pupils of the eyes of the user. The mid-point of between the eyes is computed using geometry. The orientation of the head of the HMD wearer is known from an inertial measurement unit in the HMD or from tracking technology used by the HMD. The orientation of the head and the mid-point of the eyes are taken and used to extrapolate a ray from the mid-point of the eyes away from the HMD.

To compute a 3D location of a point the user is touching, hand tracking technology is used as described above.

Where a ray has been computed (either from gaze or from pointing) it may be used as a 3D registration constraint i.e. a limit on the possible values of the registration information. In some cases the ray is intersected with a surface mesh in order to obtain a 3D position of the real world feature. A surface mesh is reconstructed from depth maps captured by the HMD. In some cases more than one ray is computed (from gaze or from pointing but not a mix of both), each ray being from a different viewpoint of the HMD, and the rays are intersected to obtain a 3D position of the real world feature.

A pair of values is stored comprising: a 3D position of the real world feature computed by the HMD and the 3D position of the real world feature known in advance with respect to the second coordinate frame. The pair of values is referred to as a correspondence and the correspondence is stored 204.

A check is made 206 to see if there are enough correspondences. In some cases the check comprises seeing if there are two correspondences or more. In some cases the check comprises assessing quality of performance of a mixed reality application. In some cases the check comprises seeing if there are more than a threshold number of correspondences, where the threshold is specified by a mixed reality application. In some cases a mixed reality service sends an accuracy level to the coordinate system registration service. The accuracy level is determined according to a use case of the mixed reality service. If the use case comprises creating and anchoring a hologram once and re-using the hologram many times then a high threshold for accuracy is set. If the use case comprises creating an anchoring a hologram once and not using it again then a lower threshold for accuracy may be set. In response to the accuracy level being below a threshold more correspondences are obtained.

In an example, depending on the accuracy requirements of the scenario, the user can be asked to identify additional features until a certain accuracy can be achieved through uncertainty reasoning in the 3D registration. If the scenario involves, creating and anchoring content once and reusing it many times, it can also make sense to ask the user to identify additional points during initial feature detection. Later, when another user tries to anchor against the same content, the number of correspondences can be dynamically adjusted to achieve the desired accuracy or to account for potentially uncertain feature detection.

Initial or additional feature detection can also be naturally integrated into the mixed reality service, where the registration has no noticeable overhead to the end-user or accuracy gradually improves as the user interacts with a hologram. For example, a hologram guide typically instructs a user to interact with a real world object (such as by pressing distinct physical buttons), where each interaction can act as a feature correspondence for the 3D registration problem to refine the registration.

In response to not having enough correspondences at check 206, the HMD wearer optionally moves 208, and the process returns to operation 200 and asks the HMD wearer to manually identify and locate another real world feature. In an example (such as that of FIG. 1) the HMD wearer is asked to walk from a bonnet of a vehicle to a rear license plate of the vehicle and to point at either the same real world feature or another real world feature on the vehicle.

In response to having enough correspondences the coordinate registration service computes 210 the registration. In an example the registration is computed using geometry from the correspondences. In an example, the Kabsch algorithm is used to compute a rotation matrix that minimizes a root mean squared deviation between the 3D points in a correspondence. This is done for each correspondence, i.e. to find one rotation matrix that when applied to all of the 3D points in the HMD coordinate frame makes them most similar to their corresponding points in the second coordinate frame. In various examples a translation vector is computed as well as a rotation matrix. Where the Kabsch algorithm computes a translation vector as well as a rotation matrix it is sometimes referred to as partial Procrustes superimposition.

Once the registration information has been computed a mixed reality service is updated 212 by sending the registration information to the mixed reality service.

Figure 3:
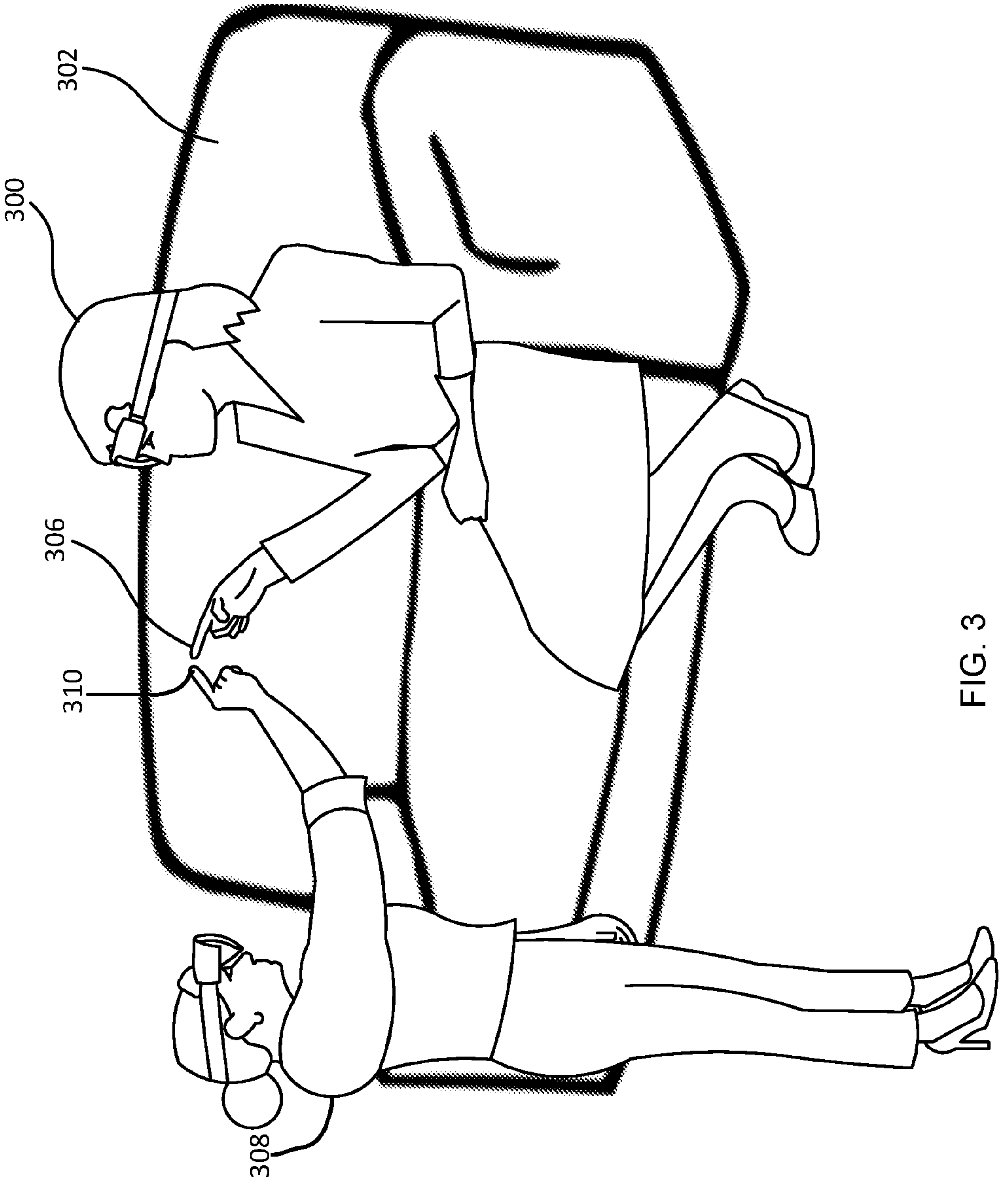
FIG. 3 shows two HMD wearers touching outstretched forefingers.

FIG. 3 shows two HMD wearers 308, 300 touching outstretched forefingers 310, 306. One HMD wearer 300 sits on a chair 302 and another HMD wearer 308 stands. In this example, the second coordinate frame is a coordinate frame of a second HMD, and the real world feature is a fingertip of a wearer of the second HMD. The 3D position of the fingertip in the second coordinate frame is known from a tracking function of the second HMD (such as any of the tracking functionalities described with reference to FIG. 1). The wearer of the HMD is requested to touch the finger tip of the second HMD wearer. A gravity direction is known from the first HMD and from the second HMD such as from gravity sensors in the HMDs where a gravity sensor is an inertial measurement unit, a gyroscope, an accelerometer or any other gravity sensor. Two or more correspondences are obtained, by asking for the fingertip touch to happen at two different locations in space. The coordinate system registration service uses the gravity direction and the correspondences to compute the registration information. The Kabsch algorithm may be used to do this or partial Procrustes superimposition or any other suitable geometry calculation. A benefit of the arrangement of FIG. 3 is usability, since the HMD wearer's are easily able to touch fingers. There is no need to remember or find another real world feature in the environment. The touching of fingers can be done in any environment in contrast to a situation where a real world feature is unique to a particular environment.

More generally, the situation of FIG. 3 comprises two HMD wearers both indicating a same point in the real world environment, either by gaze or touch or a hybrid of these. This is repeated for a second point different from the first point so that two correspondences are obtained. The HMD wearers may gaze at the same point in the real world. Or one may gaze at the point and the other touch the point.

Figure 4:
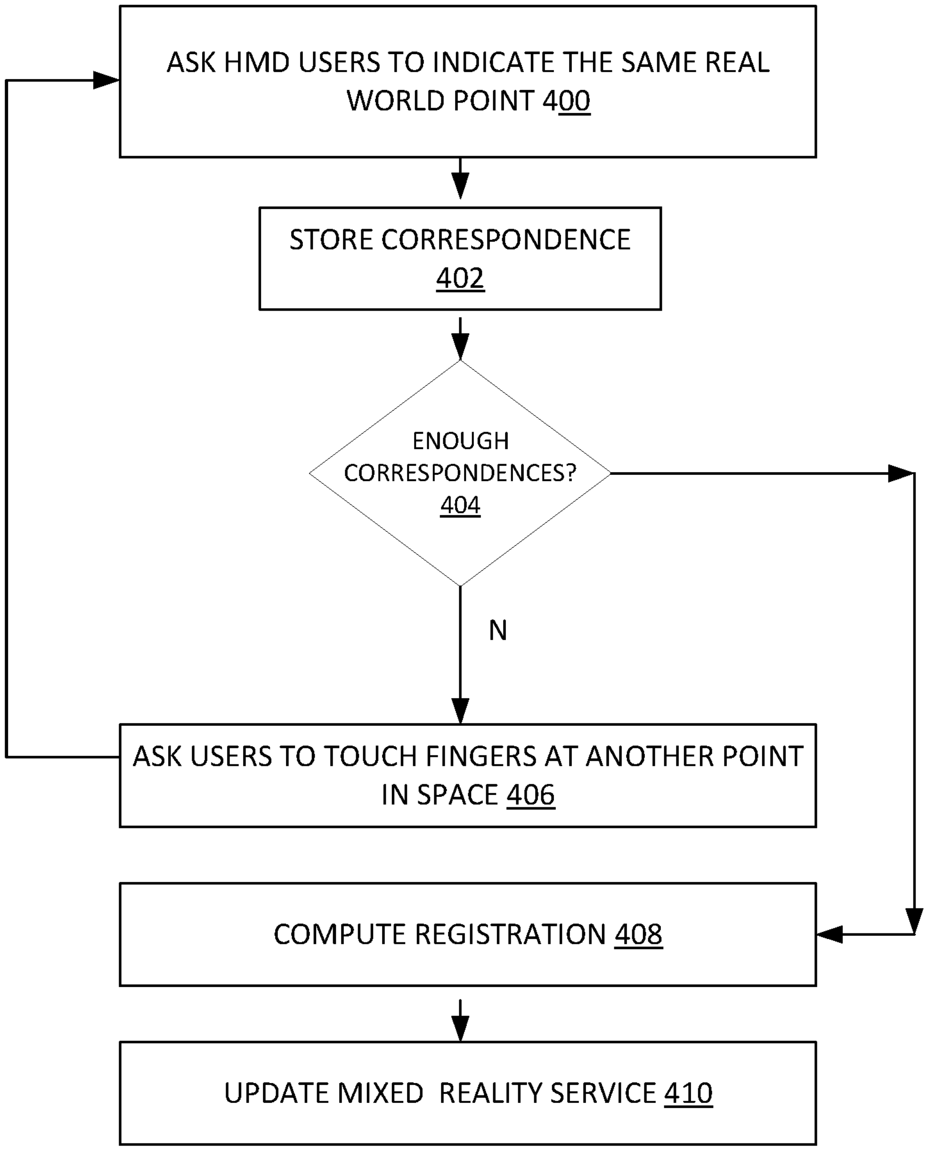
FIG. 4 is a flow diagram of a method performed by a coordinate frame registration service in a situation such as that of FIG. 3.

FIG. 4 is a flow diagram of a method performed by a coordinate frame registration service in a situation such as that of FIG. 3. Two or more HMD wearers are asked to indicate 400 the same real world point, such as by touching fingers or by gazing at the same point or by one wearer gazing at the point and one touching the point. Each HMD uses tracking functionality to track a finger or gaze of a wearer of that HMD and so computes a 3D position of the fingertip or gaze location of the wearer of that HMD with respect to a coordinate frame of that HMD. The 3D fingertip position or gaze location is sent to the coordinate frame registration service. The same is done by the other HMD. Thus the coordinate frame registration service receives both 3D positions and stores them in a pair as a correspondence. The process repeats, this time for a different location in space. Thus the coordinate frame registration service stores 402 two correspondences.

If there are not enough correspondences (see check operation 404) the process returns to operation 400 and the users are asked to indicate a same real world point again at another location in space.

If there are enough correspondences the registration is computed 408. The gravity directions of each HMD are sent to the coordinate frame registration service from gravity sensors in the HMDs. The correspondences and gravity directions are used by the coordinate frame registration service to compute a rotation and a translation for mapping between the coordinate frame of each of the HMDs. The registration information is sent to a mixed reality service 410.

Note that the process of FIG. 4 is applicable where there are more than two HMD wearers.

Figure 5:
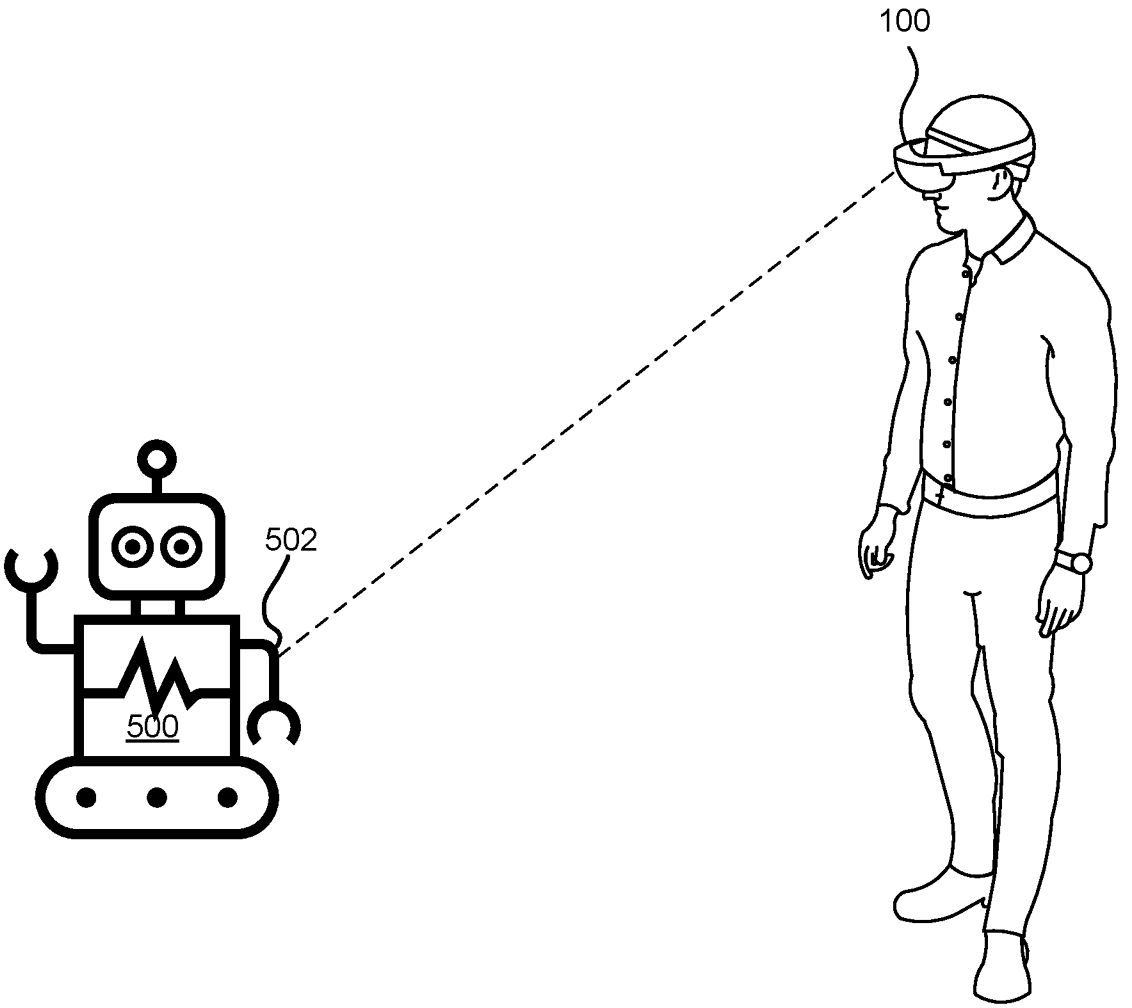
FIG. 5 shows an HMD wearer gazing at a joint of an articulated robot moving in an environment.

FIG. 5 shows an HMD 100 worn by a person gazing at a joint 502 of an articulated robot 500 moving in an environment. In this example, the second coordinate frame is a coordinate frame of an articulated autonomous robot 500 moving in the environment. The real world feature is a joint 502 of the robot. The 3D position of the real world feature 502 in the second coordinate frame is known from a simultaneous localization and mapping (SLAM) function of the robot. The SLAM function is any commercially available SLAM technology. In an example the SLAM function works by fitting images captured by the robot to a 3D model of the environment that has been constructed from point clouds captured by a depth camera of the robot, using an iterative closest point process. The SLAM process computes a 3D position and orientation of the robot with respect to the 3D model of the environment. A kinematic tree representing the joints of the robot is accessed and used to compute a 3D position of the joint 502 using inverse kinematics and the output of the SLAM process.

Figure 6:
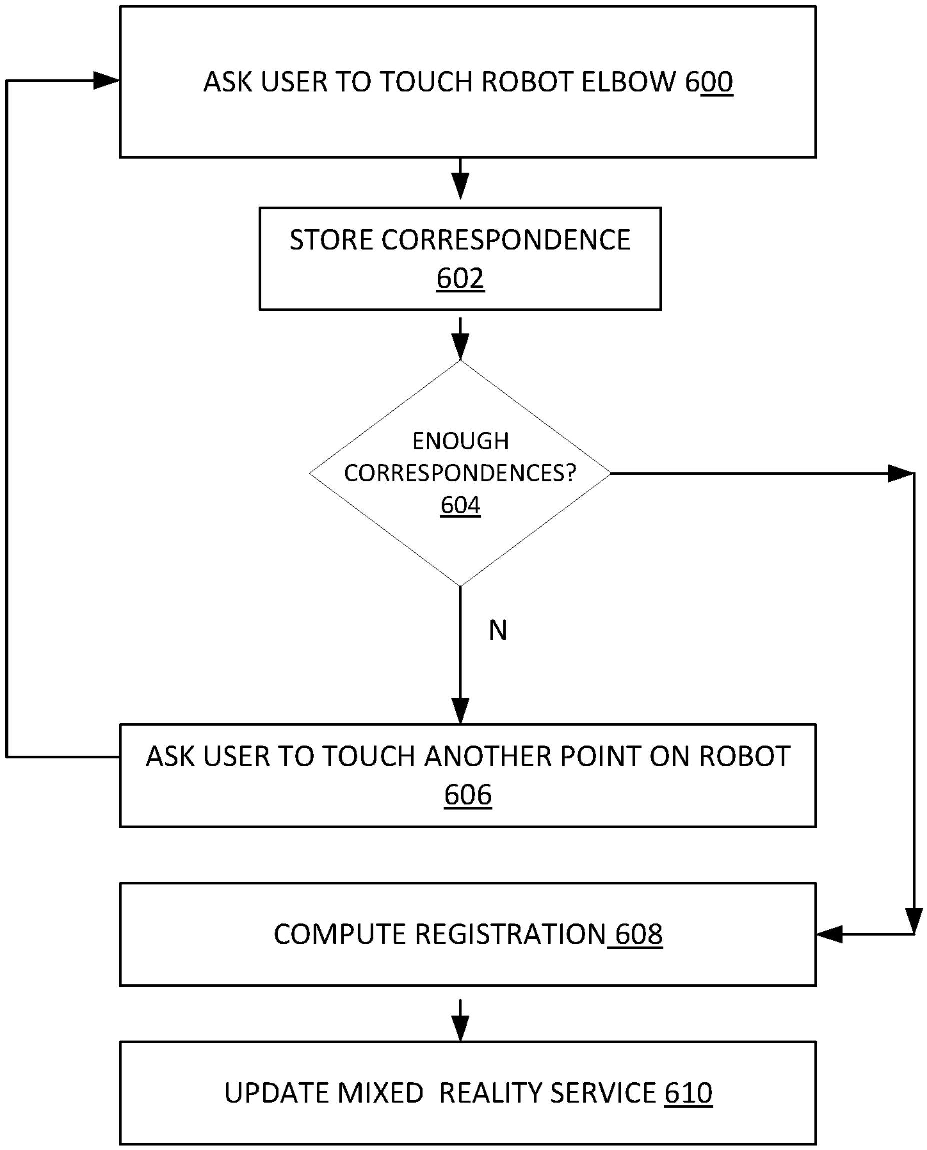
FIG. 6 is a flow diagram of a method performed by a coordinate frame registration service in a situation such as that of FIG. 5.

FIG. 6 is a flow diagram of a method performed by a coordinate frame registration service in a situation such as that of FIG. 5. A user is asked 600 to touch a specified joint of the robot such as an elbow of a robot or gaze at a specified point on the robot. The user does so and sensor data depicting the user touching the robot elbow or gazing at the point on the robot is captured by the HMD. The sensor data is used to compute a 3D position of the touch or gaze location in a coordinate frame of the HMD. The 3D position is stored together with the known 3D position of the elbow or gaze location in the robot coordinate system. Thus a correspondence is stored 602. If there are not enough correspondences at check 604 the user is asked to touch or gaze at another point on the robot, preferably another joint of the robot, since the kinematic tree can be used to calculate the 3D positions of the joints of the robot in the robot coordinate frame. Another correspondence is computed and stored. The check at operation 604 is carried out as described above for FIG. 2.

If there are enough correspondences at check 604 the registration is computed 608 using the Kabsch or partial Procrustes superimposition methods mentioned above. The registration information is sent to a mixed reality service.

Figure 7:
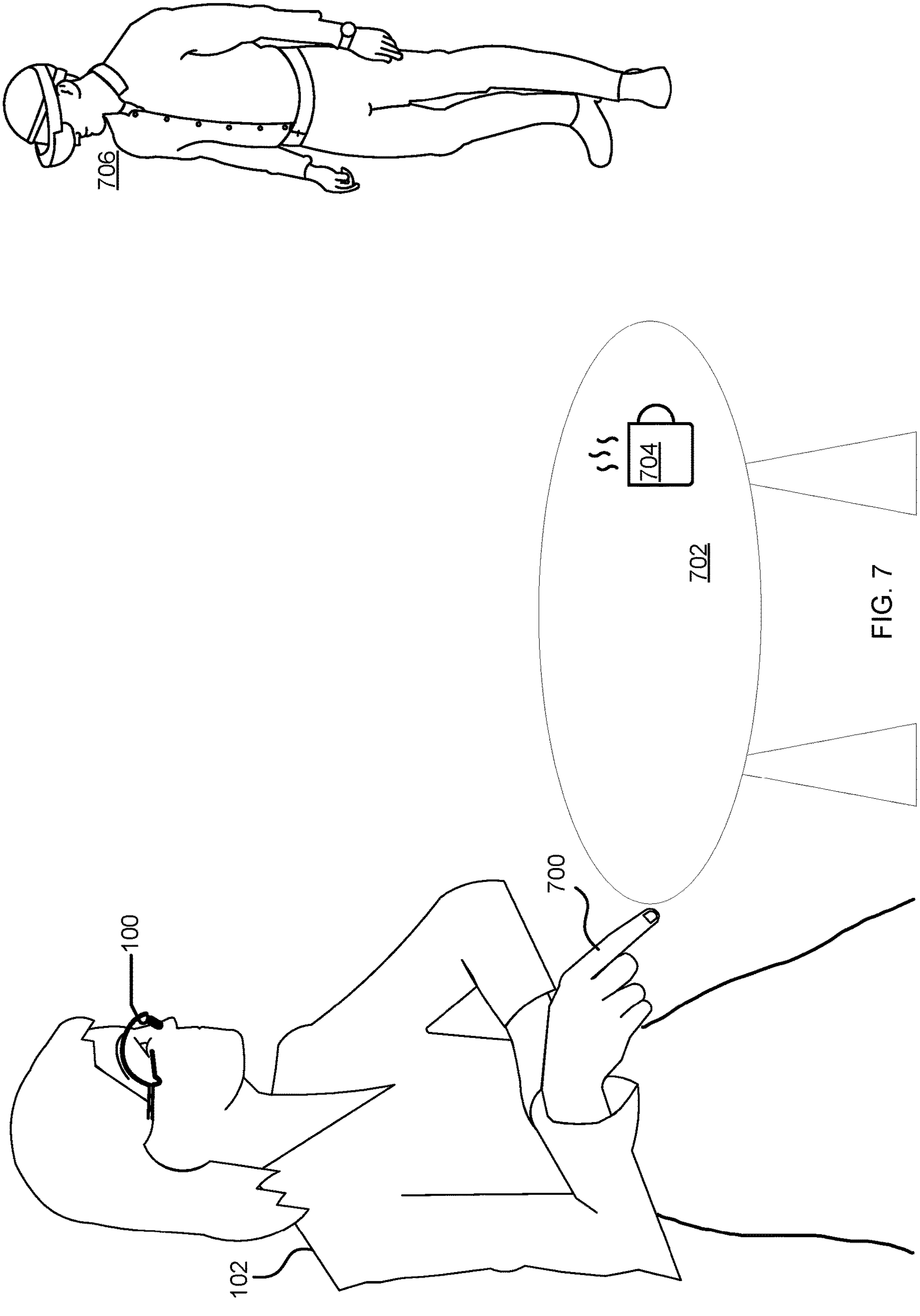
FIG. 7 shows a meeting area with a coffee table and two HMD wearers, with one of the HMD wearers tracing an edge of the coffee table top.

FIG. 7 shows a meeting area with a coffee table 702 and two HMD wearers 102, 706, with one of the HMD wearers 102 tracing an edge of the coffee table top. On the coffee table is a mug of coffee 704. In this example the real world feature is an edge of a surface in the environment (i.e. an edge of the coffee table top). The wearer of the HMD is requested to touch an edge of a real world surface in the environment with their fingertip and to move their fingertip along the edge such that the captured sensor data depicts the fingertip moving along the edge. Many correspondences are obtained because there are many points along the edge. Using the correspondences registration between a coordinate frame of the HMD wearer 102 and a coordinate frame of the surface is computed using geometry as explained above with reference to FIGS. 1 and 2.

The situation of FIG. 7 is particularly useful where there are several HMD wearers in the same environment and it is desired to share a hologram between all the HMD wearers so that the hologram is consistent for each of the HMD wearers. Thus FIG. 7 shows a second HMD wearer 706. The second HMD wearer is also asked to trace their finger along an edge of the coffee table 702. Sensor data is captured depicting the second HMD wearer tracing their finger along the edge of the coffee table. The sensor data is used to compute 3D positions on the edge in a coordinate frame of the second HMD. The 3D positions are known in a coordinate frame of the coffee table 702. Thus a plurality of correspondences are obtained and stored. The correspondences are used to compute registration information for mapping between the coordinate system of the HMD and the coordinate system of the coffee table.

It is now possible to display a shared hologram, shared between the first HMD wearer 102 and the second HMD wearer 706, using the registration information for mapping from each of the HMD coordinate systems to the coordinate system of the real world surface (e.g. coffee table). Thus the hologram appears to each HMD wearer in the same location with respect to the surface (coffee table top 702) and is appropriate for viewpoints of each of the HMDs which are different.

By having the real world feature be an edge of a surface in the environment it is straightforward for all the HMD wearers to make the actions needed to compute the registration information. Only one instruction has to be given for all the HMD users and it can be displayed on a meeting room wall for example or emitted as an audio speech signal from a loudspeaker in the room. The scenario of FIG. 7 can be extended for more than two HMD wearers.

Figure 8:
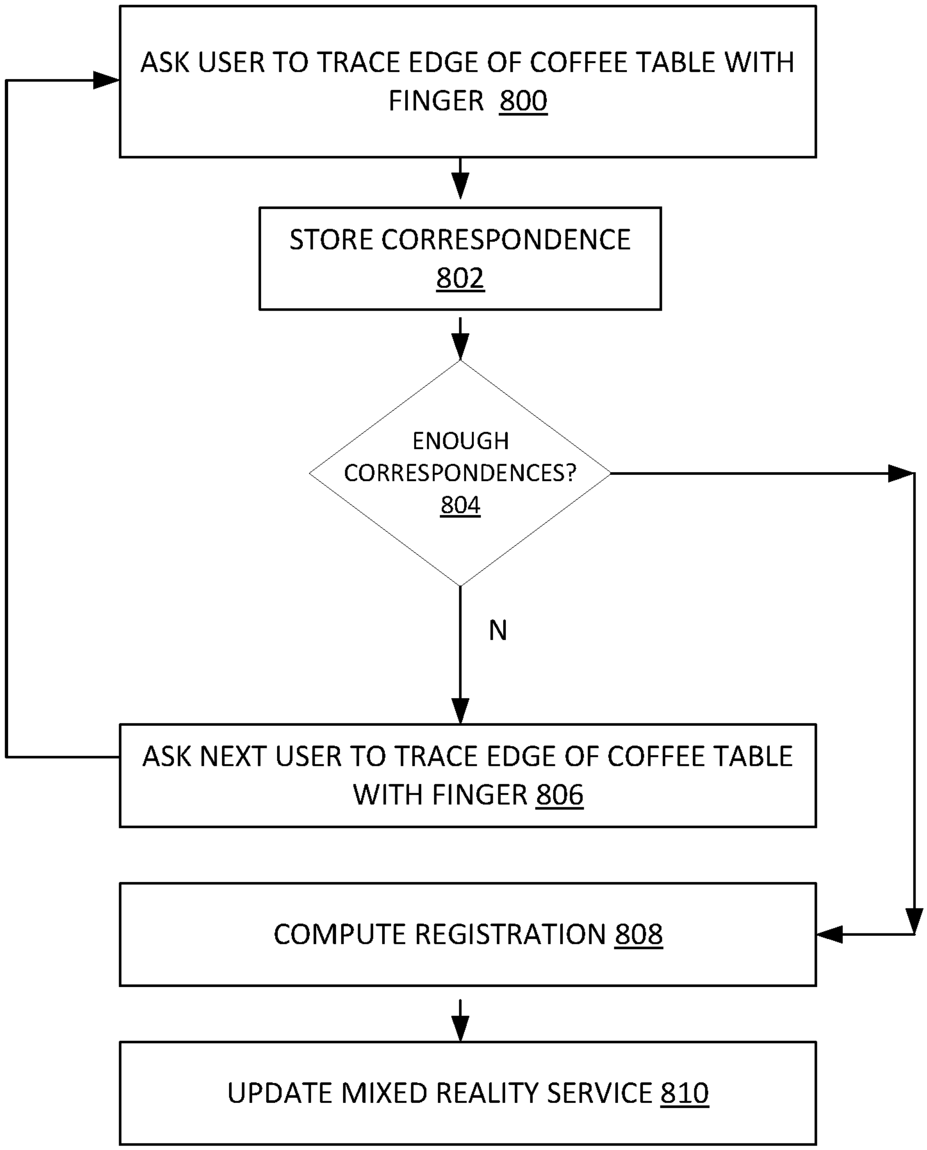
FIG. 8 is a flow diagram of a method performed by a coordinate frame registration service in a situation such as that of FIG. 7.

FIG. 8 is a flow diagram of a method performed by a coordinate frame registration service in a situation such as that of FIG. 7. An HMD wearer is asked to trace the edge of a surface such as a coffee table, door frame, whiteboard frame, or other surface with their finger or eye gaze. Sensor data depicting the HMD wearer doing the tracing is captured and used to compute correspondences as described above. The correspondences are stored 802. If there are not enough 804 correspondences to enable sharing a consistent hologram between HMD wearers, perhaps because one of the HMD wearers has not yet traced the edge, then that HMD wearer is asked 806 to trace the edge. If there are enough correspondences at check 804 the correspondences are used to compute registration information at operation 808. The registration information is computed using a Kabsch or Procrustes process. The registration information is sent to a mixed reality service.

In any of the examples described herein the mixed reality service is able to use the registration information to persist a hologram. This is done by anchoring a hologram to a real world point in an environment of the HMD; waiting while the HMD wearer leaves the environment and later returns to the environment; and computing the hologram according to a current viewpoint of the HMD and taking into account the registration information; and projecting the hologram into pupils of the HMD wearer.

In any of the examples described herein the mixed reality service is able to use the registration information to share a hologram between a plurality of HMD wearers. A request is received from a first HMD wearer to share a hologram. The request specifies a 3D location of the hologram in a coordinate frame of the first HMD. The method comprises setting the second coordinate frame to be a coordinate frame of a second HMD such that the registration information maps between the coordinate frames of the first HMD and the second HMD. The second HMD is triggered to display the hologram transformed using the registration information.

In any of the examples described herein the mixed reality service is able to anchor a hologram to a real world environment using the registration information. The second coordinate frame is set to the a coordinate frame of a 3D model used to form the hologram; or the second coordinate frame is set to be a coordinate frame of a real world object to which the hologram is to be anchored (such as the coffee table in the example of FIG. 7).

Figure 9:
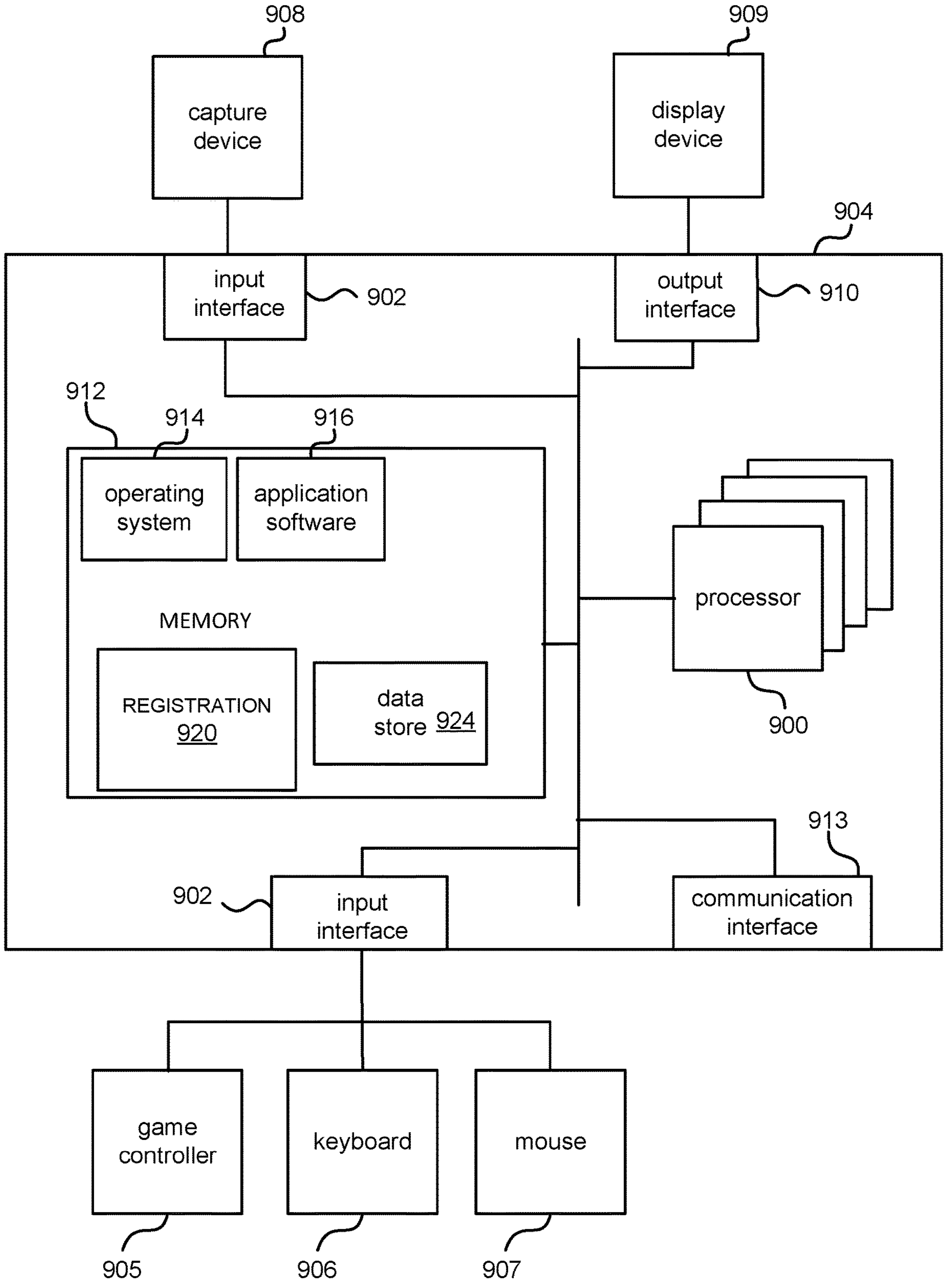
FIG. 9 illustrates an exemplary computing-based device in which examples of a coordinate frame registration service are implemented.

FIG. 9 illustrates an exemplary computing-based device 904 in which examples of a coordinate frame registration service 920 are implemented. In some examples the computing-based device is a head mounted display such as a head worn computer. In some cases the computing-based device is a companion computing device of an HMD. In some cases the computing-based device 904 is a web server or computing entity remote of an HMD and accessible to the HMD via a wired or wireless communication link such as vis communication interface 913.

Computing-based device 904 comprises one or more processors 900 which are microprocessors, controllers or any other suitable type of processors for processing computer executable instructions to control the operation of the device in order to register coordinate systems and optionally give a mixed reality service. In some examples, for example where a system on a chip architecture is used, the processors 900 include one or more fixed function blocks (also referred to as accelerators) which implement a part of the method of any of FIG. 2, 4, 6, 8 in hardware (rather than software or firmware). Platform software comprising an operating system 914 or any other suitable platform software is provided at the computing-based device to enable application software 916 to be executed on the device and to enable registration functionality 920 to execute on the device. Data store 924 holds coordinate systems, rotation matrices, translation vectors, registration information, descriptions of real world features and other data.

The computer executable instructions are provided using any computer-readable media that is accessible by computing based device 904. Computer-readable media includes, for example, computer storage media such as memory 912 and communications media. Computer storage media, such as memory 912, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 912) is shown within the computing-based device 904 it will be appreciated that the storage is, in some examples, distributed or located remotely and accessed via a network or other communication link (e.g. using communication interface 913).

The computing-based device 904 also comprises an input interface 902 and an output interface 910. The output interface is arranged to output display information to a display device 909 which may be separate from or integral to the computing-based device 904. The display information may provide a graphical user interface. The input interface 902 is also to receive and process input from one or more devices, such as a user input device (e.g. a mouse 907, keyboard 906, game controller 905). In some examples the user input device detects voice input, user gestures or other user actions and provides a natural user interface (NUI). Input interface 902 receives input from a capture device 908 such as a camera, depth camera, gravity sensor.

Alternatively or in addition to the other examples described herein, examples include any combination of the following clauses:

Clause A. A method of registering a coordinate frame of an HMD with a second coordinate frame, the method comprising:

- receiving sensor data depicting the wearer of the HMD pointing at, gazing at or touching a real world feature, where the 3D position of the real world feature in the second coordinate frame is known;
- computing a 3D position of the real world feature, in the coordinate frame of the HMD, from the sensor data;
- storing a correspondence comprising: the 3D position of the real world feature in the coordinate frame of the HMD, and a 3D position of the real world feature in the second coordinate frame;
- repeating the requesting, using, computing and storing for a second real world feature so that a second correspondence is stored;
- registering the coordinate frame of the HMD and the second coordinate frame by computing registration information mapping between the coordinate frame of the HMD and the second coordinate frame, the registration information computed from the correspondences.

Clause B. The method of clause A comprising using the registration information for any of: persisting a hologram, sharing a hologram between a plurality of HMD wearers, anchoring a hologram to a real world environment.

Clause C. The method of clause B wherein using the registration information to persist a hologram comprises anchoring a hologram to a real world point in an environment of the HMD; storing a 3D position of the real world point in a coordinate frame of the HMD; waiting while the HMD wearer leaves the environment and later returns to the environment; and computing the hologram according to a current viewpoint of the HMD and taking into account the registration information; and projecting the hologram into pupils of the HMD wearer.

Clause D. The method clause B wherein using the registration information to share a hologram between a plurality of HMD wearers comprises, receiving, from a first HMD wearer, a request to share a hologram, the request specifying a 3D location of the hologram in a coordinate frame of the first HMD; setting the second coordinate frame to be a coordinate frame of a second HMD such that the registration information maps between the coordinate frames of the first HMD and the second HMD; triggering the second HMD to display the hologram transformed using the registration information.

Clause E. The method of clause B wherein using the registration information to anchor a hologram to a real world environment comprises setting the second coordinate frame to be a coordinate frame of a 3D model used to form the hologram.

Clause F. The method of any preceding clause wherein the second coordinate frame is a coordinate frame of a second HMD, and wherein the real world feature is a fingertip of a wearer of the second HMD and the 3D position of the fingertip in the second coordinate frame is known from a tracking function of the second HMD, and comprising requesting the wearer of the HMD to touch the finger tip of the second HMD wearer; and wherein a gravity direction is known from the first HMD and from the second HMD.

Clause G. The method of any preceding clause wherein the real world feature is an edge of a surface in the environment and comprising requesting the wearer of the HMD to touch an edge of a real world surface in the environment with their fingertip and to move their fingertip along the edge such that the captured sensor data depicts the fingertip moving along the edge and such that registration between a coordinate frame of the HMD wearer and a coordinate frame of the surface is computed.

Clause H. The method of clause G repeated for each of a plurality of HMD wearers in the same environment, and comprising sharing a hologram between the HMD wearers, using the registration information, such that the hologram appears in the same location with respect to the surface to each HMD wearer and appropriate for viewpoints of each of the HMDs which are different.

Clause I. The method of any preceding clause comprising receiving, from an mixed reality service an accuracy level and, in response to the accuracy level being below a threshold, repeating the method of claim 1 for a different real world feature.

Clause J. The method of any preceding clause comprising using the registration information in an mixed reality service and, in response to an accuracy level of the registration information being below a threshold, using user input data received by the mixed reality service to obtain another correspondence.

Clause K. The method of any preceding clause comprising giving a picture, a 3D scan, or a textual description of the real world feature to the HMD wearer to enable the HMD wearer to reliably identify the real world feature.

Clause L. The method of any preceding clause where the wearer of the HMD touches the real world feature and wherein computing the 3D position of the real world feature in the coordinate frame of the HMD, from the captured sensor data, comprises tracking a hand of the HMD wearer.

Clause M. The method of any preceding clause where the wearer of the HMD gazes at the real world feature and wherein computing the 3D position of the real world feature in the coordinate frame of the HMD, from the sensor data, comprises using eye tracking functionality in the HMD to determine a ray from the wearer to the real world feature and either:

- using the ray as a 3D registration constraint; or
- intersecting the ray with a surface mesh; or
- determining another ray from a different viewpoint of the HMD and intersecting the ray and the other ray.

Clause N. The method of any preceding clause where the wearer of the HMD points an element towards the real world feature and wherein computing the 3D position of the real world feature in the coordinate frame of the HMD, from the sensor data, comprises using tracking functionality to determine a ray from the element to the real world feature and either:

using the ray as a 3D registration constraint; or intersecting the ray with a surface mesh; or determining another ray from a different viewpoint of the HMD and intersecting the ray and the other ray.

Clause O. The method of any preceding clause wherein the second coordinate frame is a coordinate frame of an articulated autonomous robot moving in the environment and wherein the real world feature is a joint of the robot, and wherein the 3D position of the real world feature in the second coordinate frame is known from a simultaneous localization and mapping (SLAM) function of the robot.

Clause P. An apparatus comprising:

a processor;

a memory storing instructions that, when executed by the processor, perform a method comprising:

requesting a wearer of an HMD to point at, or gaze at, or touch, a real world feature;

receiving sensor data captured by the HMD and depicting the wearer of the HMD pointing at, gazing at or touching the real world feature, where the 3D position of the real world feature in the second coordinate frame is known;

computing a 3D position of the real world feature, in the coordinate frame of the HMD, from the captured sensor data;

storing a correspondence comprising: the 3D position of the real world feature in the coordinate frame of the HMD, and a 3D position of the real world feature in the second coordinate frame;

repeating the requesting, using, computing and storing for a second real world feature so that a second correspondence is stored;

registering the coordinate frame of the HMD and the second coordinate frame by computing registration information mapping between the coordinate frame of the HMD and the second coordinate frame, the registration information computed from the correspondences, a gravity direction and a scale.

Clause Q. The apparatus of clause P integral with an HMD.

Clause R. The apparatus of clause P wherein the registration information comprises an orientation and a 3D translation and the apparatus is configured to send the registration information to an mixed reality service.

Clause S. The apparatus of clause P having a communication mechanism to receive the 3D position of the real world feature in the second coordinate frame from another entity selected from: a web service, another HMD, a robot.

Clause T. A head mounted display (HMD) comprising:

a processor;

a memory storing instructions that, when executed by the processor, perform a method comprising:

requesting a wearer of the HMD to point at, or gaze at, or touch, a real world feature;

using the HMD, capturing sensor data depicting the wearer of the HMD pointing at, gazing at or touching the real world feature, where the 3D position of the real world feature in the second coordinate frame is known;

computing a 3D position of the real world feature, in the coordinate frame of the HMD, from the captured sensor data;

storing a correspondence comprising: the 3D position of the real world feature in the coordinate frame of the HMD, and a 3D position of the real world feature in the second coordinate frame;

repeating the requesting, using, computing and storing for a second real world feature so that a second correspondence is stored;

registering the coordinate frame of the HMD and the second coordinate frame by computing registration information mapping between the coordinate frame of the HMD and the second coordinate frame, the registration information computed from the correspondences, a gravity direction and a scale.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner. In other embodiments, personal data may be confined to a local system, and only non-personal, summary data transmitted to a remote system.

The invention claimed is:

1. A method of registering a coordinate frame of a head mounted display (HMD) with a second coordinate frame, the method comprising:

receiving sensor data depicting a wearer of the HMD pointing at, gazing at or touching a real world feature, where a three dimensional (3D) position of the real world feature in the second coordinate frame is known;

computing a 3D position of the real world feature, in the coordinate frame of the HMD, from the sensor data;

storing a correspondence comprising: the 3D position of the real world feature in the coordinate frame of the HMD, and the 3D position of the real world feature in the second coordinate frame;

repeating the receiving, computing, and storing for a second real world feature so that a second correspondence is stored; and registering the coordinate frame of the HMD and the second coordinate frame including computing registration information mapping between the coordinate frame of the HMD and the second coordinate frame, the registration information computed from the correspondences.

2. The method of claim 1 comprising using the registration information for any of: persisting a hologram, sharing the hologram between a plurality of HMD wearers, and anchoring the hologram to a real world environment.

3. The method of claim 2 wherein using the registration information to persist the hologram comprises anchoring the hologram to a real world point in an environment of the HMD; storing a 3D position of the real world point in the coordinate frame of the HMD; waiting while the wearer of the HMD leaves the environment and later returns to the environment; computing the hologram according to a current viewpoint of the HMD and taking into account the registration information; and projecting the hologram into pupils of the wearer of the HMD.

4. The method of claim 2 wherein using the registration information to share the hologram between the plurality of HMD wearers comprises, receiving, from a first HMD wearer, a request to share the hologram, the request specifying a 3D location of the hologram in a coordinate frame of the first HMD; setting the second coordinate frame to be a coordinate frame of a second HMD such that the registration information maps between the coordinate frames of the first HMD and the second HMD; and triggering the second HMD to display the hologram transformed using the registration information.

5. The method of claim 2 wherein using the registration information to anchor the hologram to the real world environment comprises setting the second coordinate frame to be a coordinate frame of a 3D model used to form the hologram.

6. The method of claim 1 wherein the second coordinate frame is a coordinate frame of a second HMD, and wherein the real world feature is a fingertip of a wearer of the second HMD and the 3D position of the fingertip in the second coordinate frame is known from a tracking function of the second HMD, and comprising requesting the wearer of the HMD to touch the fingertip of the wearer of the second HMD; and wherein a gravity direction is known from the HMD and from the second HMD.

7. The method of claim 1 wherein the real world feature is an edge of a real world surface in an environment of the HMD and comprising requesting the wearer of the HMD to touch the edge of the real world surface in the environment with their fingertip and to move their fingertip along the edge such that the received sensor data depicts the fingertip moving along the edge and such that registration between the coordinate frame of the wearer of the HMD and a coordinate frame of the real world surface is computed.

8. The method of claim 7 repeated for each of a plurality of HMD wearers in the same environment, and comprising sharing a hologram between the plurality of HMD wearers, using the registration information, such that the hologram appears in the same location with respect to the real world surface to each HMD wearer and appropriate for viewpoints of each of the HMDs which are different.

9. The method of claim 1 comprising receiving, from a mixed reality service an accuracy level of the registration information and, in response to the accuracy level being below a threshold, repeating the receiving, computing, storing, repeating, and registering for a different real world feature.

10. The method of claim 1 comprising using the registration information in a mixed reality service and, in response to an accuracy level of the registration information being below a threshold, using user input data received by the mixed reality service to obtain another correspondence.

11. The method of claim 1 comprising giving a picture, a 3D scan, or a textual description of the real world feature to the wearer of the HMD to enable the wearer of the HMD to reliably identify the real world feature.

12. The method of claim 1 where the wearer of the HMD touches the real world feature and wherein computing the 3D position of the real world feature in the coordinate frame of the HMD, from the received sensor data, comprises tracking a hand of the wearer of the HMD.

13. The method of claim 1 where the wearer of the HMD gazes at the real world feature and wherein computing the 3D position of the real world feature in the coordinate frame of the HMD, from the sensor data, comprises using eye tracking functionality in the HMD to determine a ray from the wearer to the real world feature and either:

using the ray as a 3D registration constraint; or intersecting the ray with a surface mesh; or determining another ray from a different viewpoint of the HMD and intersecting the ray and the other ray.

14. The method of claim 1 where the wearer of the HMD points an element towards the real world feature and wherein computing the 3D position of the real world feature in the coordinate frame of the HMD, from the sensor data, comprises using tracking functionality to determine a ray from the element to the real world feature and either:

using the ray as a 3D registration constraint; or intersecting the ray with a surface mesh; or determining another ray from a different viewpoint of the HMD and intersecting the ray and the other ray.

15. The method of claim 1 wherein the second coordinate frame is a coordinate frame of an articulated autonomous robot moving in an environment of the HMD and wherein the real world feature is a joint of the robot, and wherein the 3D position of the real world feature in the second coordinate frame is known from a simultaneous localization and mapping (SLAM) function of the robot.

16. An apparatus comprising:

a processor;

a memory storing instructions that, when executed by the processor, perform a method comprising:

requesting a wearer of an HMD to point at, or gaze at, or touch, a real world feature;

receiving sensor data captured by the HMD and depicting the wearer of the HMD pointing at, gazing at or touching the real world feature, where a 3D position of the real world feature in a second coordinate frame is known;

computing a 3D position of the real world feature, in the coordinate frame of the HMD, from the received sensor data;

storing a correspondence comprising: the 3D position of the real world feature in the coordinate frame of the HMD, and a 3D position of the real world feature in the second coordinate frame;

repeating the requesting, receiving, computing and storing for a second real world feature so that a second correspondence is stored;

registering the coordinate frame of the HMD and the second coordinate frame by computing registration information mapping between the coordinate frame of the HMD and the second coordinate frame, the registration information computed from the correspondences, a gravity direction and a scale.

17. The apparatus of claim 16 wherein the registration information mapping is computed using a Kabsch algorithm or partial Procrustes superimposition.

18. The apparatus of claim 16 wherein the registration information comprises an orientation and a 3D translation and the apparatus is configured to send the registration information to a mixed reality service.

19. The apparatus of claim 16 having a communication mechanism to receive the 3D position of the real world feature in the second coordinate frame from another entity selected from: a web service, another HMD, and a robot.

20. A head mounted display (HMD) comprising:

a processor;

a memory storing instructions that, when executed by the processor, perform a method of registering a coordinate frame of the HMD with a second coordinate frame, the method comprising:

requesting a wearer of the HMD to point at, or gaze at, or touch, a real world feature;

using the HMD, capturing sensor data depicting the wearer of the HMD pointing at, gazing at or touching the real world feature, where a three dimensional (3D) position of the real world feature in the second coordinate frame is known;

computing a 3D position of the real world feature, in the coordinate frame of the HMD, from the captured sensor data;

storing a correspondence comprising: the 3D position of the real world feature in the coordinate frame of the HMD, and the 3D position of the real world feature in the second coordinate frame;

repeating the requesting, using, computing and storing for a second real world feature so that a second correspondence is stored; and registering the coordinate frame of the HMD and the second coordinate frame including computing registration information mapping between the coordinate frame of the HMD and the second coordinate frame, the registration information computed from the correspondences, a gravity direction and a scale.

* * * * *